(12) United States Patent
Peiker

(10) Patent No.: US 7,068,783 B2
(45) Date of Patent: Jun. 27, 2006

(54) TELEPHONE SET WITH A HANDSET HAVING A MOUTHPIECE AND/OR AN EARPIECE

(76) Inventor: Andreas Peiker, Max-Planck-Strass 32, D-61381 Friedrichsdorf (DE)

( * ) Notice: Subject to any disclaimer, the term of this patent is extended or adjusted under 35 U.S.C. 154(b) by 715 days.

(21) Appl. No.: 09/884,963

(22) Filed: Jun. 21, 2001

(65) Prior Publication Data

US 2002/0003874 A1 Jan. 10, 2002

Related U.S. Application Data

(63) Continuation of application No. 08/981,708, filed as application No. PCT/IB96/00606 on Jun. 24, 1996.

(30) Foreign Application Priority Data

| Jun. 23, 1995 | (CH) | ................................ 1843/95 |
| Jan. 5, 1996 | (AT) | ..................................... 7/96 |
| Mar. 5, 1996 | (CH) | .................................. 575/96 |
| Mar. 14, 1996 | (CH) | .................................. 678/96 |
| Mar. 14, 1996 | (CH) | .................................. 679/96 |
| May 15, 1996 | (CH) | ................................. 1236/96 |

(51) Int. Cl.
*H04M 1/00* (2006.01)

(52) U.S. Cl. ...................... 379/446; 379/455
(58) Field of Classification Search ................ 379/446, 379/455, 454; 455/575.9
See application file for complete search history.

(56) References Cited

U.S. PATENT DOCUMENTS

| 362,004 | A | 4/1887 | Harrison |
| 3,632,158 | A | 1/1972 | Boothe |
| 4,647,722 | A | 3/1987 | Nishida et al. |
| 4,821,309 | A | 4/1989 | Namekawa |
| 5,063,611 | A | 11/1991 | Kitabayashi |
| 5,131,036 | A | 7/1992 | Dunchock |
| 5,230,016 | A | 7/1993 | Yasuda |
| 5,239,300 | A | 8/1993 | Berger et al. |
| 5,276,728 | A | 1/1994 | Pagliaroli et al. |
| 5,282,246 | A | 1/1994 | Yang |
| 5,301,224 | A | 4/1994 | Major |
| 5,333,176 | A | 7/1994 | Burke et al. |
| 5,371,783 | A | 12/1994 | Rose et al. |
| 5,404,580 | A | 4/1995 | Simpson et al. |
| D362,004 | S | 9/1995 | Nakano et al. |
| 5,463,688 | A | 10/1995 | Wijas |
| 5,535,274 | A | 7/1996 | Braitberg et al. |
| 5,561,712 | A | 10/1996 | Nishihara |
| 5,566,226 | A | 10/1996 | Mizoguchi et al. |
| 5,659,887 | A | * 8/1997 | Ooe ........................... 379/446 |
| 5,664,015 | A | 9/1997 | Ford et al. |
| 5,797,088 | A | 8/1998 | Stamegna |
| 5,896,564 | A | 4/1999 | Akama et al. |
| 5,898,775 | A | 4/1999 | Niemo et al. |
| 5,956,399 | A | 9/1999 | Whitley et al. |
| 5,995,622 | A | 11/1999 | Roussy et al. |
| 6,043,626 | A | 3/2000 | Snyder et al. |
| 6,208,734 | B1 | 3/2001 | Ortscheid et al. |
| 6,263,080 | B1 | 7/2001 | Klammer et al. |

FOREIGN PATENT DOCUMENTS

| CH | 665174 A5 | 4/1988 |
| DE | 3621990 A1 | 1/1987 |
| DE | 8807334 | 8/1988 |

(Continued)

*Primary Examiner*—Jack Chiang
(74) *Attorney, Agent, or Firm*—Birch, Stewart, Kolasch & Birch, LLP

(57) ABSTRACT

A telephone assembly including a handset containing a microphone and/or a receiver. The handset is equipped with a space designed to hold a hand-held cordless telephone that can be removed from the handset, and for electrical coupling of the cordless telephone.

17 Claims, 8 Drawing Sheets

FOREIGN PATENT DOCUMENTS

| | | |
|---|---|---|
| DE | 3727917 A1 | 3/1989 |
| DE | 4015091 | 1/1991 |
| DE | 4107996 A1 | 3/1991 |
| DE | 4107995 C2 | 9/1992 |
| DE | G9311242.4 U1 | 10/1993 |
| DE | G9311294.7 U1 | 2/1994 |
| DE | 4244625 A1 | 6/1994 |
| DE | G9409336.9 U1 | 9/1994 |
| DE | 19652826 A1 | 6/1998 |
| DE | 19850044 C1 | 3/2000 |
| EP | 0354367 A3 | 2/1990 |
| EP | 0464011 A1 | 1/1992 |
| EP | 0545670 A2 | 6/1993 |
| EP | 0751043 A1 | 1/1994 |
| EP | 0585011 A1 | 3/1994 |
| EP | 0593055 A1 | 4/1994 |
| EP | 0617535 | 9/1994 |
| EP | 0751043 A1 | 1/1997 |
| EP | 0833762 B1 | 4/1998 |
| GB | 2270405 A | 3/1994 |
| GB | 2286744 * | 8/1995 ........ 379/446 |
| JP | 03-101056 U | 10/1991 |
| JP | 05-176030 A | 7/1993 |
| JP | 05-211548 A | 8/1993 |
| JP | 05-294190 A | 11/1993 |
| JP | 06-318884 A | 11/1994 |
| JP | 07-30626 A | 1/1995 |
| JP | 7032951 | 2/1995 |
| JP | 07-135521 A | 5/1995 |
| WO | 9422234 | 9/1994 |
| WO | WO 94/22237 A1 | 9/1994 |
| WO | WO 94/28684 | 12/1994 |

\* cited by examiner

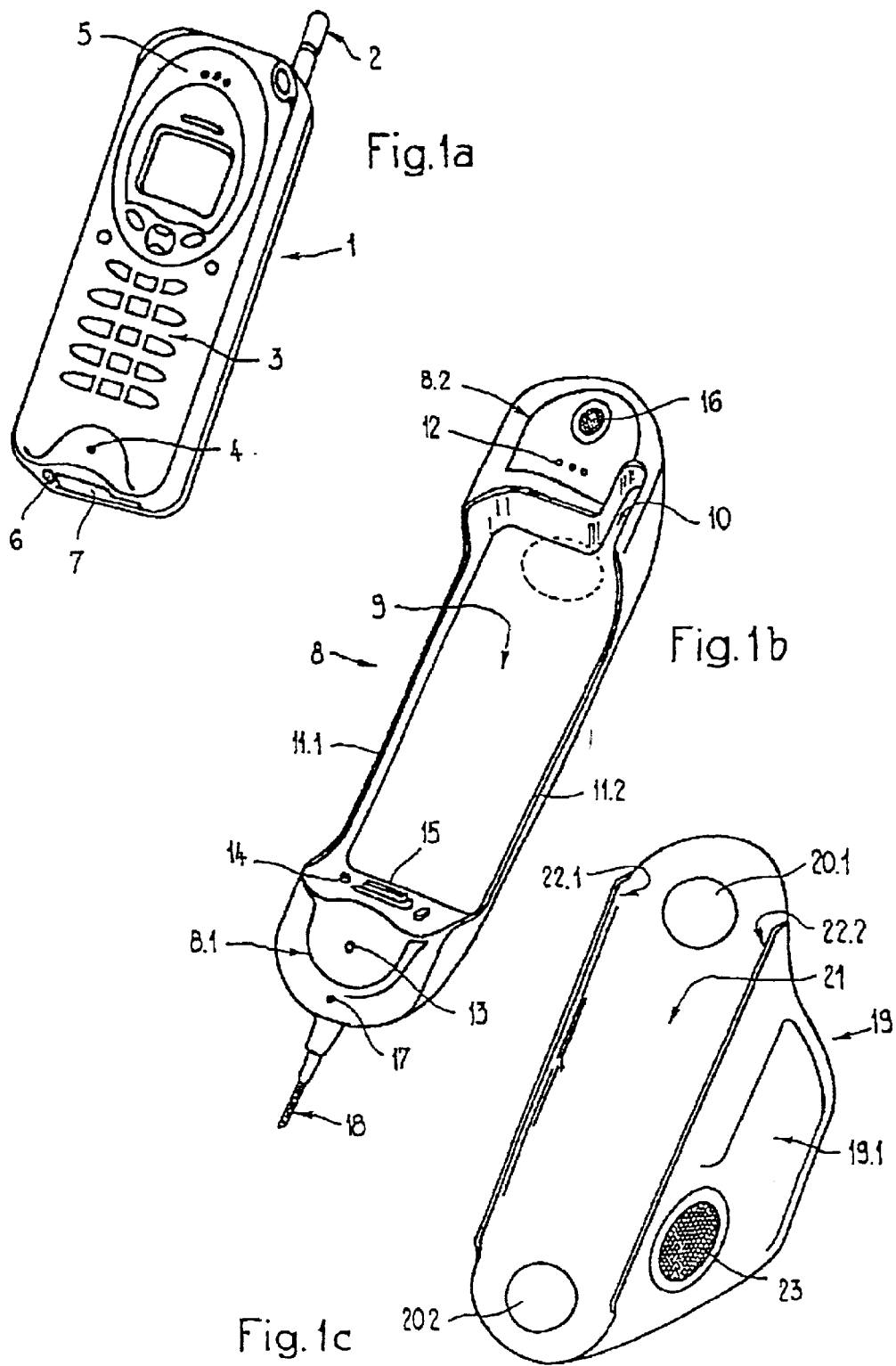

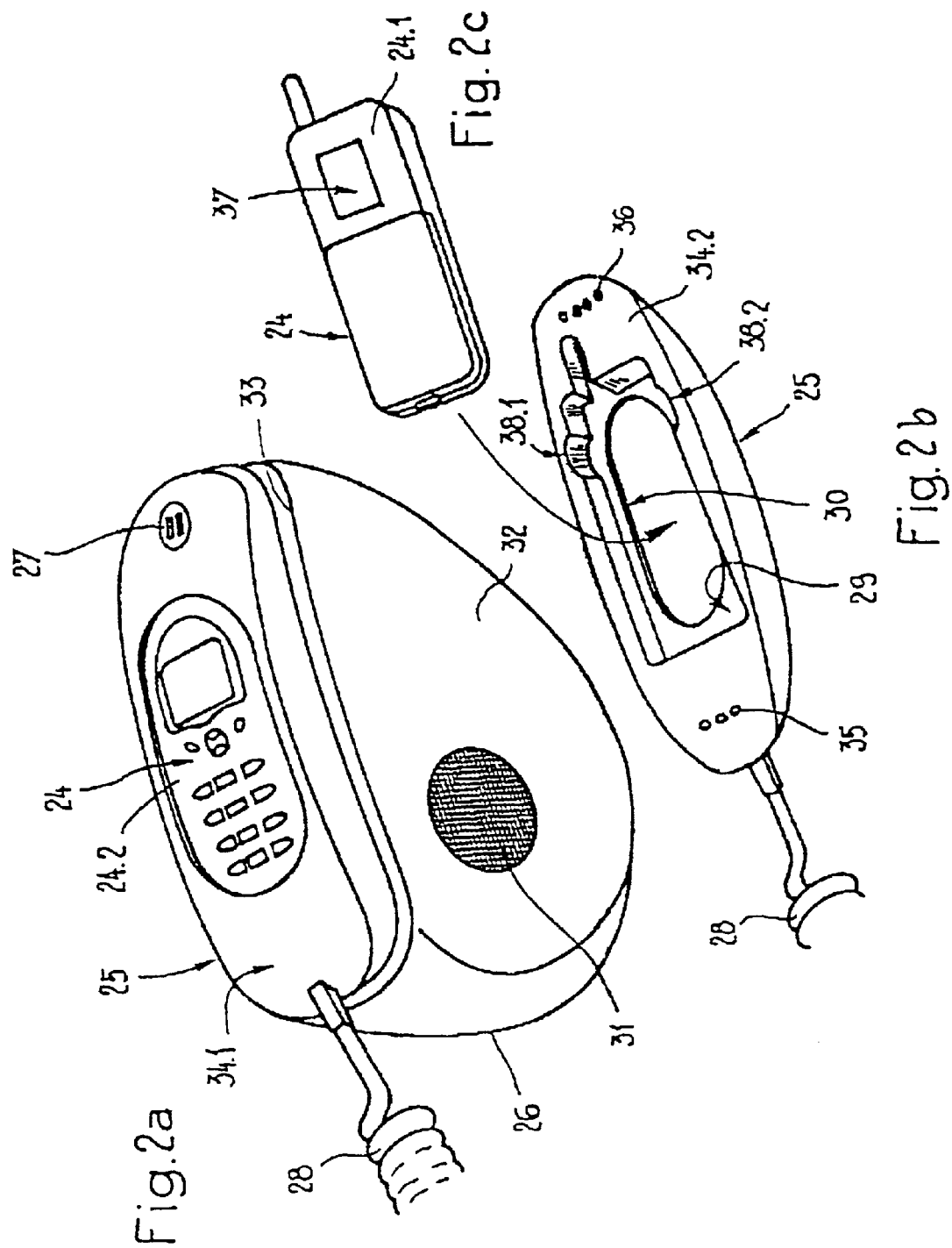

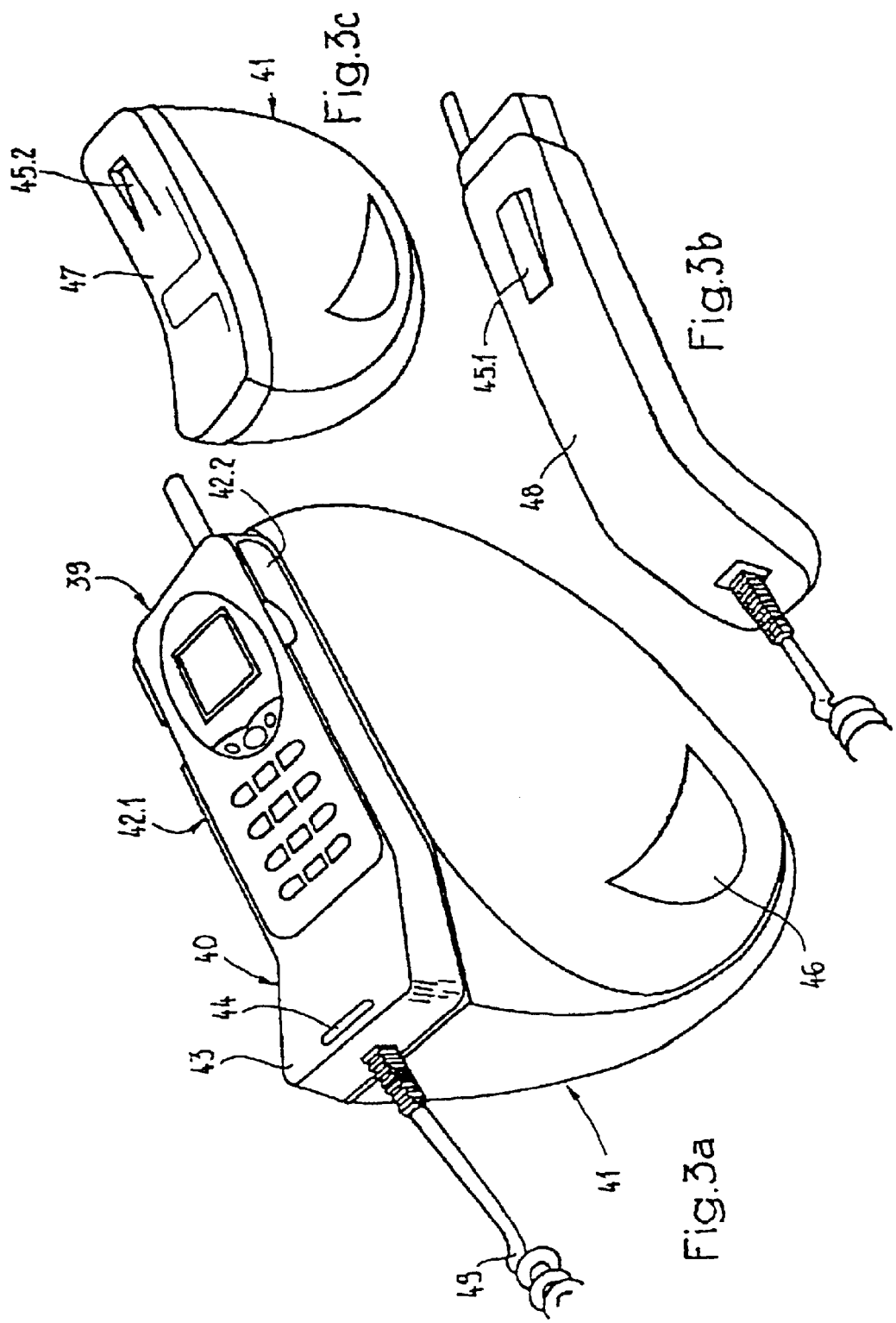

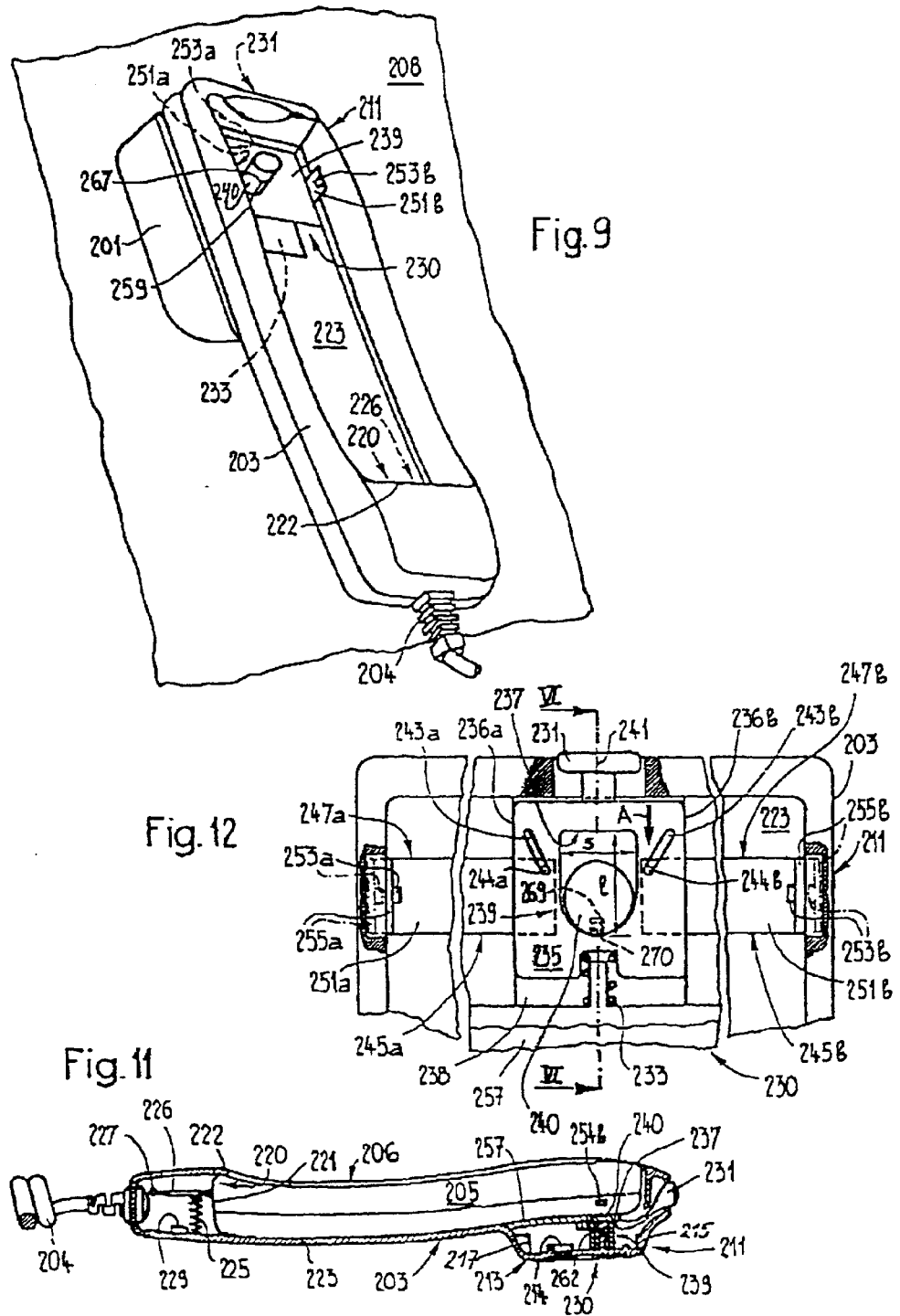

TELEPHONE SET WITH A HANDSET HAVING A MOUTHPIECE AND/OR AN EARPIECE

BACKGROUND OF THE INVENTION

Telephone assemblies for mounting in vehicles vary widely in their design.

One mounting fixture for a transportable mobile telephone, known in the art from the German utility model G 93 11294.7, is comprised basically of two opposing side panels and a base plate that connects them to one another. The mobile telephone is placed in between the side panels and rests on the base plate. It is held securely by a positive- or non-positive lock connection. The mounting fixture is fastened with screws, for example, to the side panel of a center console between the driver's seat and the passenger's seat inside the vehicle.

A mounting fixture for a mobile radio telephone, known in the art from EP 0 545 670 A2, is comprised of two interlocking components. The outer component is firmly fastened with screws to a base. The inner component represents a sort of seesaw into which the hand-held radio telephone can be inserted from the front. The seesaw can be tilted along a horizontal axis. In a forward position, the seesaw is prepared to accept the device. When it is tilted backward it is held securely by a locking mechanism. The mechanism is released by a lever that is positioned on the underside of the seesaw and is operated by pressing down on the hand-held radio telephone.

In the German utility model G 93 11 242.4, a two-component mounting fixture for a hand-held radio telephone is described. In this model a separate clip piece is fastened to the hand-held radio telephone; this clip is equipped with a tongue which can be slid into a corresponding groove in the mounting fixture. Further, an HF shielding and antenna component is described, which is connected via a coaxial cable to an on-board antenna system for the vehicle. The antenna component is coupled to the antenna component of the mobile telephone in the form of a galvanic connection between the antenna component of the hand-held radio telephone and the on-board antenna of the vehicle. If the hand-held radio telephone is capable of hands-free operation, it can be left in the mounting fixture during operation. If it is not desired that third persons in the vehicle hear the conversation, the radio telephone can be removed from the mounting fixture, so that the user can use the telephone with the receiver at his or her ear. In either case, the hand-held radio telephone is equipped with an antenna line that is connected to the on-board antenna of the vehicle. If the telephone is to be used outside of the vehicle, then clip components and shielding or antenna components, respectively, are removed.

One possibility for hand-free telephone operation using a hand-held radio telephone is known in the art, for example, from EP 0 464 011 A1. It is recommended here that an adapter, which is connected to a loudspeaker and a transmitter, be connected to a corresponding plug-type connector in the hand-held radio telephone. In this case, the external transmitter and external loudspeaker largely replace those that are integrated into the hand-held radio telephone.

It is the object of the invention to provide a radio telephone set that comprises a device for holding a hand-held radio telephone, which can be used in the broadest sense as a mounting fixture. The device should be especially suited for installation and use in the passenger compartment of a vehicle. In addition, it should be simple and comfortable to use.

The handset is preferably comprised of a hand-held shell that can be mounted to a console and is electrically connected to this console, and into, which the hand-held radio telephone (preferably a so-called handy) can be inserted, thus creating an electrical coupling.

The hand-held shell is an intermediate component that is connected via a cable to the console, and as a result is connected to the on-board antenna. It represents a sort of "telephone sleeve" into which the hand-held radio telephone, as the functioning unit, is inserted.

The hand-held shell preferably contains a receiver mouthpiece and/or an earpiece, which can be connected electrically to a telephone circuit integrated in the hand-held radio telephone, so that they can be used in place of the mouthpieces and ear-pieces of the hand-held radio telephone. The hand-held shell is thus designed as a type of telephone receiver, which is connected to the console via a telephone cord. The telephone circuit (which ensures that connections can be made with a central exchange and that a subscriber can be reached via his official number) is accessed from the inserted hand-held radio telephone. In other words, the hand-held shell and the console form a sort of "case" that is to be "filled" with the hand-held radio telephone.

In one preferred embodiment, the swing-out insertion piece of the hand-held shell, which is designed as a sort of sheath, contains at least one collar piece on which the lower portion of a hand-held radio telephone rests when the insertion piece is swung into line. When the unit is swung out around a swiveling axis that holds the insertion piece, the front (sheath) edge is moved both forward and downward in a relative motion to the preferably fixed collar piece. This permits the hand-held radio telephone to be easily removed. The collar piece acts as an "ejector." The lower portion of the hand-held radio telephone is shifted relatively forward and upward, but is held fast laterally. In its removal, however, it no longer can be jammed against the sides of the sheath. The sides of the sheath can thus no longer be damaged, specifically its upper edge cannot be broken off.

The rear panel of the insertion piece is preferably extended beyond the upper edge of the sheath; in other words, it is extended upward. This extension serves as a guide plate for the hand-held radio telephone to be inserted.

The hand-held shell may contain an interface to the source of power for the hand-held radio telephone, and to the signals transmission, especially antenna signals. This means that the hand-held radio telephone transmits and receives signals from the communications center via the on-board antenna rather than via its own antenna. Its own antenna serves only for the transmission of signals to the on-board transmitting and receiving unit. Naturally, it is not necessary for the console to have an antenna. In any case, the hand-held radio telephone is equipped with its own antenna. The interface is preferably designed for galvanic, separable coupling (transmission). Inductive, optical, transmission, especially telephone signals, may also be used. It is also conceivable for the console to be fixed and connected via a conventional or digital wire line to a central exchange.

The hand-held shell need not necessarily be connected to the console via a cable. It is also conceivable for the hand-held shell to be designed as a mobile component of cordless telephone.

The hand-held shell is preferably equipped with a recessed area to hold the hand-held radio telephone, designed such that the latter is, or appears to be, an integrated component of the shell, and does not protrude out of the shell. The hand-held shell is thus larger in shape than the hand-held radio telephone. When the mobile telephone is removed, the shell looks like as though a corresponding piece had been "cut out."

The hand-held shell may be curved like a conventional telephone receiver, wherein the ear-piece and the mouthpiece are positioned on an inner surface of the curved telephone receiver, and the recessed area for the hand-held radio telephone is constructed such that the keypad on the hand-held radio telephone is accessible from an outer side (or from the side that is opposite the side on which the mouthpiece and ear piece are positioned).

The mounting fixture is preferably equipped with an ejection device which brings the hand-held radio telephone, after it has been released, into an easily accessible position.

In a further variation on the invention, the mounting fixture is constructed such that it requires only a single spring for the ejection device and a single spring for the locking and release mechanism. The entire mounting fixture with the release and locking devices is integrated into the base of the shell that holds the hand-held radio telephone. In other words, these mechanical components are designed such that they are narrow in thickness.

For hands-free operation it is particularly advantageous for the hand-held shell and the console to be designed such that when the shell is placed on the console, the keypad on the hand-held radio telephone is accessible. Thus, the shell need not be removed from the console to permit operation of the telephone.

It is advantageous for the hand-held shell itself to be equipped with a hands-free transmitter. A circuit connection ensures that when the hand-held radio telephone is placed in the hand-held shell it automatically switches from the handheld radio telephone's receiving and transmitting devices to those of the hand-held shell. This switch-over can, for example, be activated via mechanical or electrical sensors that are automatically actuated when the hand-held radio telephone is placed in the hand-held shell. Switch-over may also be effected manually.

The hand-held shell contains, for example, a continuous recessed area for the hand-held radio telephone, which gives the shell a ring-shaped appearance when the hand-held radio telephone is removed.

The console itself has an external shape that is like a segment of a circle, for example, wherein the hand-held shell is placed on a secant surface of the segment. The console looks, for example, like a half wheel of cheese.

In one preferred embodiment of the invention, the handheld shell is equipped with a swing-out insertion piece for the hand-held radio telephone. This serves to ensure a particularly user-friendly insertion and removal of the handheld radio telephone. The insertion can also be improved if the insertion piece remains arrested in its swung-out position of approximately 10*. This swung-out position is preferably maintained by a spring, in order to prevent swinging or rattling brought on by vibrations or shaking of the automobile. In a further preferred design variation, the insertion piece is designed to be sheath-like, wherein the rear panel of the sheath extends upward over the edge of the sheath. This portion of the rear panel of the sheath serves as a guiding rail for the handheld radio telephone to be partially inserted in the sheath opening. The guiding rail can be swung out toward the front with the insertion piece, or can remain in a fixed position. The swiveling axis that permits this swinging out extends nearly perpendicular to the lengthwise axis of the sheath. It may be positioned either within the sheath or above the sheath.

The hand-held shell may, as is illustrated in FIGS. 1 through 4, be shaped like a shell that will hold the hand-held radio telephone. It may, however, also be dumbbell-shaped, with a recessed area for the upper and the lower portions of the hand-held radio telephone, and a narrow connecting strip between these two portions. This design reduces the overall width of the hand-held radio telephone placed in the "handheld shell"; this presents a advantage particularly for women having delicate, small hands. The connecting strip may be curved in an ergonomic design.

A loudspeaker on the console for hands-free operation of the telephone is provided on the flat surface of the circle segment. A hands-free transmitter should be suitably positioned, so that it is directed toward the vehicle steering wheel.

For mounting the shell onto the console, magnetic mounts are preferred. Clamp-, clip-, or hook-type fasteners are, however, also possible.

Both the hand-held shell and the hand-held radio telephone are supplied with power via the console. The power can be used to power the telephone or to charge an accumulator in the hand-held radio telephone.

Further advantageous exemplary embodiments and combinations of characteristics are given in the following description of details and in the totality of the patent claims.

BRIEF DESCRIPTION OF THE FIGURES

The diagrams used to further elucidate the exemplary embodiments show:

FIGS. 1a–c are schematic illustrations of a telephone assembly comprising a hand-held radio telephone, a handheld shell, and a console;

FIGS. 2a–c are schematic illustrations of a telephone assembly comprising a hand-held radio telephone, a handheld shell containing a continuous recessed area for the hand-held radio telephone, and a console, wherein the hand-held shell and the hand-held radio telephone illustrated in FIGS. 2b and 2c are tilted 180° along their longitudinal axes in relation to the position illustrated in FIG. 2a;

FIGS. 3a–c are schematic illustrations of a hand-held radio telephone in a hand-held shell, wherein the hand-held shell has only a mouthpiece, and in FIG. 3b the hand-held shell is shown tilted 180° along its longitudinal axis in relation to its illustration in FIG. 3a;

FIGS. 4a–d are a variation on the telephone assemblies illustrated in FIGS. 1 through 3 comprising a swing-out insertion piece for the hand-held radio telephone as a component of the hand-held shell, wherein FIG. 4a shows a longitudinal section through the hand-held shell and the console, with the hand-held radio telephone indicated by a dashed line, not in cross-section, FIG. 4b shows a rear view of the hand-held shell, FIG. 4c shows a side view of the hand-held shell placed in the console, without the hand-held radio telephone, along the line of sight IVc indicated in FIG. 4a, and FIG. 4d shows an overhead view of the console.

FIG. 9 is a perspective, overhead view of the telephone assembly illustrated in FIG. 8, wherein here the hand-held radio telephone has been removed;

FIG. 11 is a longitudinal, center section of the telephone assembly illustrated in FIG. 8;

FIG. 12 is an overhead view of a mounting unit located in the upper area of the shell, designed for mounting the hand-held radio telephone, enlarged in relation to FIGS. 8 through 11;

DETAILED DESCRIPTION OF THE PREFERRED EMBODIMENTS

Figure 4A:
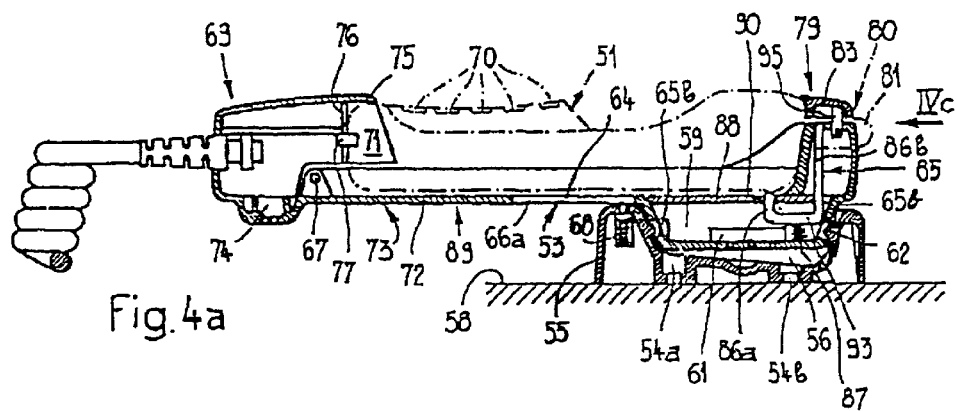
Figure 4B:
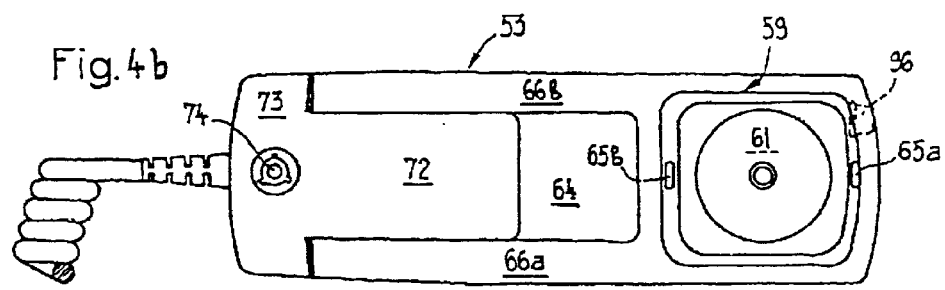

FIG. 1a shows a schematic, perspective illustration of a hand-held radio telephone 1. This telephone is rectangular, when viewed from the front, and is relatively narrow in thickness. One side of the upper end contains an antenna 2. One surface of the lower end contains a main connection 6 and a connector plug 7, as part of a detachable interface. The hand-held radio telephone 1 is supplied with power via the main connection 6. If the hand-held radio telephone 1 is equipped with an accumulator, this can be charged via the main connection 6. The function of the connector plug 7 will be described in greater detail below.

In a traditional manner, the hand-held radio telephone is equipped with a keypad 3, a microphone 4 (as the mouthpiece) and an ear-piece 5.

The hand-held radio telephone 1 can be inserted into a hand-held shell 8 in accordance with the invention, as is schematically illustrated, for example, in FIG. 1b. The handheld shell 8 is, for example, designed as a type of large telephone receiver. It is equipped with a recessed area 9 for the rectangular (or right parallelepiped or plate shaped) body of the hand-held radio telephone, as well as a recessed area 10 for the antenna 2. The shell 8 is only slightly wider than the hand-held radio telephone 1. On the longitudinal sides of the recessed area 9 are two narrow side panels 11.1 and 11.2. They cover the longitudinal side panels of the hand-held radio telephone 1, but not completely, so that the hand-held radio telephone 1 can be easily removed from the recessed area 9.

At the lower end of the recessed area 9, the hand-held shell 8 is equipped with a mouthpiece component 8.1 with a microphone 13. In its side panel that is adjacent to the recessed area 9, a power supply contact 14 is positioned, and, as a further component of the interface, a connector plug 15 as a connecting counterpart to the main connection 6 and to the connector plug 7 of the hand-held radio telephone 1 are provided.

A display diode 17 at the lower end of the mouthpiece component 8.1 indicates, for example, whether or not the hand-held shell is in operation. In addition, the mouthpiece component 8.1 is equipped with a cable 18, which connects the hand-held shell 8 with a console in accordance with FIG. 1c or an on-board antenna of the vehicle.

At the upper end of the hand-held shell 8, a receiver cap 8.2 comprising an earpiece 12, a recessed area 10 for the antenna 2, and a hand-free microphone 16 is provided.

The connector plug 15 permits an electrical coupling of the hand-held radio telephone 1 and the hand-held shell 8. In particular, the microphone 13 and the loudspeaker in the ear-piece 12 can be contacted via the connector plug 15. When the hand-held radio telephone 1 is placed in the hand-held shell 8, a circuit integrated into the hand-held radio telephone 1 automatically switches from the hand-held radio telephone's own mouthpiece 4 or ear-piece S to the corresponding components 13 and 12 in the shell 8. The switch-over can also be effected by pressing a button designed for this purpose on the hand-held radio telephone. In addition, an antenna signal can be read or fed in via the connector plug 15. The signal and/or the power transmission for the hand-held radio telephone 1 can, as described above, follow via galvanic paths; however, inductive or optical transmission, especially of the telephone signals, is also possible.

It is also conceivable, however, for an inductive tapping of the signal to occur in the receiver component 8.2 in the recessed area 10. In order to prevent disturbances in transmission, it must be ensured that transmission via the on-board antenna (of the console) and via the antenna 2 of the hand-held radio telephone 1 does not take place simultaneously.

The hand-held radio telephone is inserted from the front into the recessed area 9, wherein first the connector plug 7 of the hand-held radio telephone is inserted into the connector plug 15. In addition, the recessed area is preferably constructed such that in the insertion of the hand-held radio telephone 1 some latching resistance must be overcome, so that the hand-held radio telephone 1 is held securely in the hand-held shell 8 in a positive- and non-positive locking connection. In addition, it may be advantageous for the assembly to include an ejecting mechanism. Such a mechanism would comprise, for example, a button that can be operated on the outside of the shell 8 and that operates an ejection lever, which pushes the hand-held radio telephone 1 out of the recessed area 9.

The hand-held shell is connected to a console 19 in accordance with FIG. 1c (in a manner not illustrated in greater detail), via the cable 18. The console is equipped with a supporting surface 21 containing two magnetic mounts 20.1, 20.2, and two rails 22.1, 22.2 that run lengthwise along the console. The rails ensure the proper justification of the hand-held shell 8 on the console 19. On the rear side of the shell 8, not visible in FIG. 1b, the magnetizable components that correspond to the magnetic mounts 20.1, 20.2 are positioned.

The trapezoidal console 19 is equipped on its side panel surface 19.1, which is perpendicular to the supporting surface 21, with a speaker 23 that will enable handsfree operation.

The console 19 and the hand-held shell 8 are matched to one another and to the hand-held radio telephone with respect to their shape as follows: the length and the width of the supporting surface 21 correspond largely to the length and the width of the handheld shell 8, namely (particularly) the rear side of the shell, which is not illustrated in FIG. 1b. The shell 8 thus represents an overall continuation of the outer shape of the console 19. Similarly, the hand-held radio telephone 1 fits into the hand-held shell 8. The former does not extend beyond the latter in terms of its shape.

In the embodiment of the invention illustrated in FIGS. 1a–c, both the keypad 3 on the hand-held radio telephone 1 and the microphone and speaker from the mouthpiece and ear-piece of the hand-held shell 8 are directed upward (that is, away from the console) when the hand-held radio telephone 1 is placed with the hand-held shell 8 onto the console 19. Another variation of the invention is illustrated in FIGS. 2a through 2c.

In the design illustrated in these diagrams, a hand-held radio telephone 24 can be inserted into a slightly curved hand-held shell 25. The shell 25 is equipped for this purpose with an indentation 29 in its inner surface 34.2. When the hand-held radio telephone 24 is in the inserted position, its rear side 24.1 is basically flush with the inner surface 34.2 of the hand-held shell 25. In addition, the inner surface 34.2 of the shell is equipped at one end with a microphone 35 and at the other end with an ear piece 36.

The indentation 29 is provided with an opening 30 which extends lengthwise along the indentation and opens it up for the front side 24.2 of the hand-held radio telephone 24 that is inserted into the hand-held shell 25. A cable 28 ("telephone cord") connects the hand-held shell 25 with a console 26. The cable 28 is attached to the lower end of the shell.

As can be seen in FIG. 2a, the convex, curved outer surface 34.1 of the handheld shell 25 is equipped with a hands-free microphone 27, which in the present example is positioned at its upper end.

An external speaker 31 necessary for hands-free operation is positioned on a lateral surface 32 of the console 26 that is shaped as a segment of a circle.

The hand-held shell 25 can be placed upon a so-called secant surface 33 of the console 26. (If the console 26 is viewed from the side, it takes on the appearance of a segment of a circle. The secant surface is understood to refer to that face of the console which has as its boundary the "projected" secant, in other words not the circular arcshaped, curved surface, but rather the generally level surface.) The inner surface 34.2 of the hand-held shell 25 faces away from the console 26. A mounting component 37 (such as a clip) found on the rear side 24.1 of the hand-held radio telephone 24 can be fastened by being brought into contact with a corresponding mounting component (not illustrated in the diagrams) on the secant surface 33 of the console 26. It is preferable, however, if the hand-held shell 25 can also be mounted to the console 26 separately from the hand-held radio telephone 24.

Because the hand-held shell 25 encompasses the hand-held radio telephone 24 in a ring shape, the latter is accessible from both the front 24.2 and the rear 24.1. Specifically, the keypad on the hand-held radio telephone 24 is freely accessible when the telephone is mounted with the shell 25 to the console 26. As in the exemplary embodiment illustrated in FIGS. 1a through 1c, the hand-held radio telephone 24 is advantageously held in the hand-held shell 25 via a locking mechanism. Due to the opening 30 and the lateral recesses 38.1, 38.2 (on the lengthwise side panels of the indentation 29), the hand-held radio telephone 24 can be easily removed from the shell 25.

The hand-held radio telephone may be equipped, in a preferred embodiment, with a microphone and an ear-piece, which would be omitted in a simplified design.

A third variation is illustrated in FIGS. 3a through 3c.

A hand-held radio telephone is indicated here with the figure number 39. This can be inserted into a hand-held shell 40, which is open toward the front and at the top. The hand-held radio telephone 39 is held securely between two lateral guides 42.1 and 42.2.

A slightly angled foot piece 43 in the shell 40 contains the electrical or electronic components that are necessary for the connection or operation of the hand-held radio telephone 39 in the shell 40. In the present example, part of this is a microphone 44. In addition, a helix cable 49 extends from the foot piece 43.

The console 41 is in the shape of a cut wheel of cheese. A secant surface 47 (which also represents the cut side of the cheese wheel) is equipped with a latch mechanism 45.2. This corresponds to a latch mechanism 45.1 on a rear surface 48 of the hand-held shell 40.

On a side or main surface of the console 41, a half-moon shaped speaker opening 46 is positioned.

To eliminate the requirement of turning the shell 40 along its longitudinal axis to enable telephone operation, a "ridge-shaped" design could also be used, wherein an additional microphone and ear-piece would preferably be positioned on the inner side, which would be activated when the shell was lifted.

A fourth variation on the invention is shown in FIGS. 4a through 4d. Again, a hand-held radio telephone is indicated with the figure number 51, and can be inserted into a hand-held shell 53. The shell 53 is mounted on a console 55 such that it can be removed. Both components 53 and 55 are made of plastic in an injection molding process.

The console 55 is designed to be nearly square with an inner basin 56, and is fastened to the dashboard surface 58 in the interior of a vehicle, not illustrated here, via two screws 57a and 57b that lie within two recessed borings 54a and 54b. The inner basin 56 forms the counterpart to a receiver cap 59 that is positioned in the upper portion of the hand-held shell 53. The receiver cap 59 contains a receiver 61 (dynamic, piezoelectric, . . . ). The inner basin is equipped, on two opposing walls of the basin, with a spring-mounted nub 62 and a fixed nub 63, which fit into corresponding recesses 65a and 65b in the side panels of the receiver cap 59. The spring-mounted nub 62 is designed as a spring-mounted bracket on the side panel. In addition, the console 55 is equipped with a spring-mounted contact pin 65 for electrical switch-over functions.

The hand-held shell 53 has two bifurcated lateral ridges 66a and 66b, extending from the receiver cap 59 and separated by a recessed area 64, the ends of which either are connected by a shaft 67 or each contains a shaft piece. The receiver cap 59 is closed off with a base plate 88. The shaft 67 serves as a swiveling axis for a sheath-type insertion piece into which the lower edge of the hand-held radio telephone 51 can be inserted. Through the recessed area 64, in as much as they are present, additional indication and operation elements positioned on the rear side of the hand-held radio telephone 51, not illustrated here, can be operated. The depth of the sheath is only great enough to enable the telephone to be held securely, while the buttons 70 on the hand-held radio telephone 51 remain easily accessible. The swiveling axis 67 is positioned in the upper portion of the sheath cavity 71. A guide plate 72 extends the rear panel of the sheath 73 beyond the edge of the sheath 75. This gives the insertion piece 69 a slipper-like" appearance. In the rear panel of the sheath 73 a microphone 74 (dynamic, electrostatic (electret), etc.) is positioned. The receiver 61 and the microphone 74 can be activated via the contact pin 68. In FIGS. 4a through 4d, the electrical wiring is not illustrated.

In the base of the sheath 76, as in the above designs, an interface 77 for the power and signal coupling of the hand-held radio telephone 51 is positioned. The mounting of the console 55 in the interior of the vehicle is accomplished such that the hand-held radio telephone 51 can be inserted into the insertion piece 69 from the top. The buttons 70 are on the outside when the hand-held radio telephone 51 is inserted, so that they are accessible also in an inserted position.

Figure 4C:
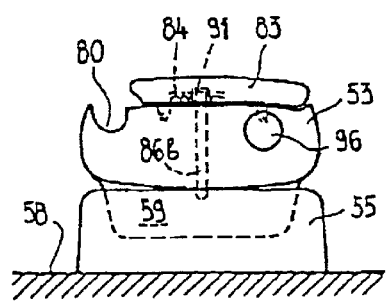
Figure 4D:
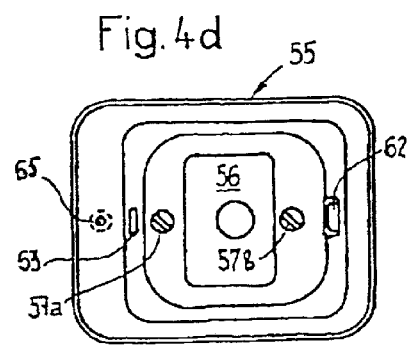

At the end of the hand-held shell 53 that is opposite the insertion piece 69 a mounting component 79 with a locking mechanism for the upper portion of the hand-held radio telephone 51 is positioned. The locking mechanism is equipped with a lengthwise groove 80 that fits the cross-section of the antenna 81 of the hand-held radio telephone 51, to hold the antenna in place. This lengthwise groove 80 can be bridged (closed) with a slide coupler 83, such that the antenna 81, and thereby the hand-held radio telephone 51, is held securely in the hand-held shell 53. The slide coupler 83 is held in the locked position via an extension spring 84. In the upper portion of the mounting component 79, a U-shaped locking-element 85 with legs 86*a* and 86*b* of unequal length is positioned. The short leg 86*a* extends through the base plate 88 of the shell 53 in a boring 90, and in FIG. 4*a* is inserted through the rear side 89 of the hand-held radio telephone 51 against the force of a spring 87. This causes the long leg 86*b* to be pushed out of a pockethole 91. In this position, the slide coupler 83 is drawn over the lengthwise groove 80 and fastens the hand-held radio telephone 51 via its antenna 81. FIG. 4*c* shows the console 55 with the hand-held shell 53 inserted, but with the hand-held radio telephone 51 removed. In this case the long leg 86*b* is pushed into the pocket hole 91, which causes the slide coupler 83 to hold open the lengthwise groove 80 against the force of the extension spring 84.

When the hand-held radio telephone 51 is inserted into the hand-held shell 53, the leg 86*a* is pressed downward against the force of the pressure spring 87, and the slide coupler 83, as a result of the force of its extension spring 84, is drawn over the antenna 81 which lies inside the lengthwise groove 80. To remove the hand-held radio telephone 51 from the shell 53, it must be grasped on its upper portion, and the slide coupler 83 must be pushed to the left with the thumb until the antenna is released. The hand-held radio telephone 51 can then be removed, which causes the leg 86*a*, during removal, to be pushed out by only a few degrees, up to its stop in the base piece 93 of the base plate 88 via the spring 87, which at the same time causes the long leg 86*b* of the locking lever 85 to be pushed into the pocket hole 91, which causes the slide coupler 83 to be held in the position of being pushed toward the left, against the force of its extension spring 84. This causes the lengthwise groove to remain open. The hand-held radio telephone 51 can be replaced to this position at any time.

When the hand-held radio telephone 51 is returned to the hand-held shell 53, if the hand-held radio telephone 51 is nearly completely pushed in, the short leg 86*a* is pressed downward and the slide coupler 83 is released as a result of the long leg 86*b* being pulled out, causing the slide coupler to be pushed over the antenna 81 by the spring 84. The hand-held radio telephone 51 is again locked in.

The lateral orientation of the locking element 85 is achieved via the boring 90 in the base plate 88, and via a further boring 95 below the slide coupler 83 in the wall of the hand-held shell.

The hand-held radio telephone 51 is held in the hand-held shell 53 such that the buttons are freely accessible. Since the shell 53 is equipped on its "rear side" with both an earpiece and a microphone, the hand-held radio telephone 51 can be operated without requiring that it be twisted in the hand.

Via a button 96 located on the "top end" of the shell 53, the telephone operation can be turned on and off.

Figure 5:
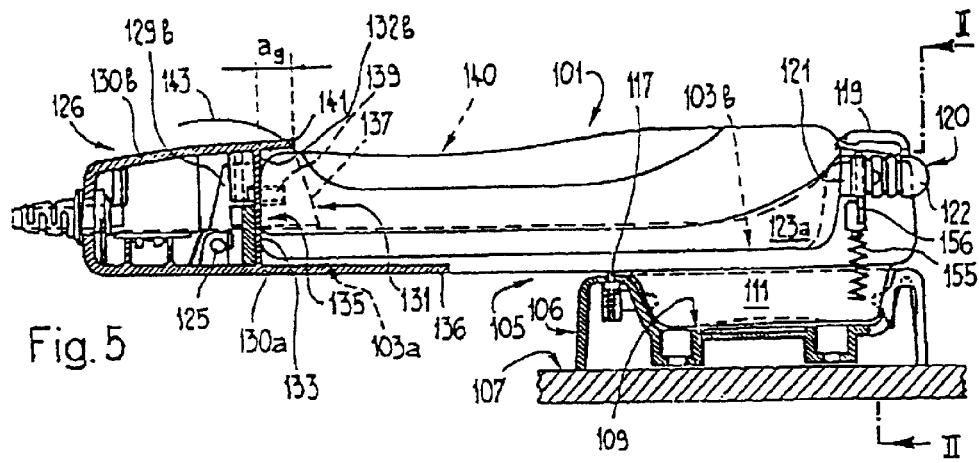
FIG. 5 is a side view of a telephone assembly, wherein the hand-held shell, which holds the hand-held radio telephone and is designed to act as a base component, is shown in longitudinal section; the base component is held in a mounting fixture, illustrated here in longitudinal section.
Figure 7:
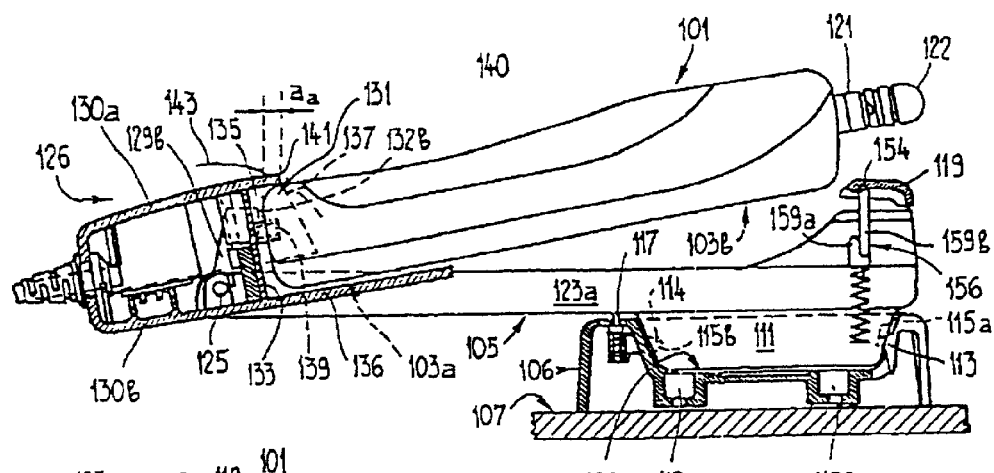
FIG. 7 is a longitudinal section as shown in FIG. 5, but with a hand-held radio telephone that is released, swung forward, and pushed slightly upward.
Figure 6:
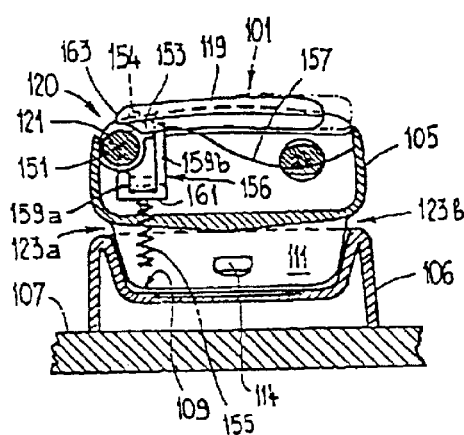
FIG. 6 is a cross-section along the line II—II indicated in FIG. 5 (the dashed positioning of the sliding coupler is assumed by the telephone assembly when the hand-held radio telephone is removed)

FIGS. 5 through 7 illustrate a further variation.

The mounting of the hand-held radio telephone, designed here as a handy or hand-held radio telephone 101, in a base piece 105, designed as a hand-held shell, is implemented via a locking mechanism 119. The locking mechanism 119 automatically encompasses at least one surface of the handy 101 upon its insertion, keeping it from falling out. The locking mechanism 119, designed as a spring-loaded slide coupler, is positioned at the upper end of the base piece 105, and can be shifted cross-wise to its lengthwise axis.

The base piece 105 contains in its upper section, in the area of the spring-loaded slide coupler 119, a basin 120 as the holding unit for the antenna base 121 of the antenna 122 of the handy 101. In FIGS. 5 through 7, the antenna 122 is shown in a retracted position. The slide coupler 119 and the basin 120 are designed with a view to the cross-section of the antenna base 121, such that the antenna base 121 can be inserted into the basin 120 and the basin can be closed off with the slide coupler 119 such that the handy 101 becomes fastened in its position.

The sliding coupler 119, as is especially illustrated in FIG. 6, is provided with an edge recess 151 that matches the cross-section of the antenna base 121, and a lengthwise groove 153 that ends in a stepped groove indentation 154. Below the slide coupler 119, within the upper section of the base piece 105, is a U-shaped tappet 156 that is under the force of a pressure spring. The slide coupler 119 is held in its position that extends over the inserted antenna base 121 via the force of a leaf spring 157. The U-shaped tappet 156 has one short and one long leg 159*a* or 159*b*. The pressure spring 155 acts upon the leg connector 161. If the slide coupler 119 is pulled away from the antenna base 121, perpendicular to the axis of the latter, the end of the long leg 159*b* is slid along a groove up to the end of the slide coupler 163 that is closest to the antenna base and in the stepped groove indentation 154. The antenna base 121, which lies within the basin 120, is released and is pushed out of the basin 120 via the short leg 159*b*, which extends through the base of the basin. The locking of the end of the long leg into the groove indentation 154 causes the slide coupler 119 to be secured in its retracted position. If the antenna base 121 is now pressed into the basin, the tappet 156 becomes pressed in against the force of the pressure spring 155, the long leg 159*b* is forced out of the groove indentation 154, and the leaf spring 157 pushes the slide coupler 119 over the antenna base 121; the upper section of the handy 101 is held in place.

Instead of the short leg 159*a* acting upon the antenna base 121, its mounting can be designed such that it engages any spot on the upper portion of the rear panel of the handy 101; the lower portion of the handy is held in place by the insertion piece 126 described below.

Lying within the insertion piece 126, but in the end area of the lateral ridges 123*a* and 123*b*, and near the shaft 125, collar pieces 129*a* and 129*b* are positioned. In this case as well, due to the schematic illustration in FIGS. 5 and 7, only one collar piece 129*b* is visible. The height of the collar pieces 129*a* and 129*b* is such that it corresponds to the maximum width allowance for the insertion piece 126 from its rear panel 130*a* to its front panel 130*b*. Each of the collar pieces 129*a* and 129*b* is equipped with a supporting surface 132*a* or 132*b* that faces the opening 131 of the insertion piece 126, on which the lower end 133 of the handy 101 rests. The supporting surfaces 132a and 132b lie perpendicular to the rear panel of the base and parallel to the axis 125.

The depth of the insertion piece 126 is selected, in accordance with the below observations, such that the lower portion of the handy 101 is held securely when the insertion piece is in the swung-in position, and can be easily removed when it is swung outward, without allowing damage to the front side 130b of the insertion piece, especially without sections of it being broken off or torn.

The swiveling axis 125 is positioned in the upper portion of the sheath-type insertion cavity 135. A guide plate 136 extends the rear panel 130a beyond the edge 137 of the insertion cavity. This gives the insertion piece 126 a "slipper-like" appearance. In the rear panel of the insertion piece (rear panel of the sheath) 130a is a (not illustrated) microphone (dynamic, electrostatic (electret) . . . ), The receiver cap and microphone can be activated via the contact pin 117. In FIGS. 5 through 7 the electrical wiring is not illustrated.

The insertion piece 126 contains an interface 139 for the power and signal coupling of the handy 101. The space below the collar pieces 129a and 129b in the insertion piece 126 serves particularly to house electronic circuitry, for example, for charging, signals processing, or signals adaptation. The mounting of the console 106 (for example, in the interior of a vehicle) is implemented such that the handy 101 can be inserted into the insertion piece 126 from the top. The buttons 140 are on the outside when the handy 101 is inserted, so that they are also accessible when the handy is in the inserted position.

The forward edge 141 on the front panel 130a of the insertion cavity edge 137 moves along an arc 143 around the shaft 125 when the insertion component 126 is swung outward. The supporting surfaces 132a and 132b remain in place when it is swung out; the handy 101 is, however, swung forward, in other words, the lower end 133 of the handy 101 is rolled off of the supporting surfaces 132a and 132b, causing the handy 101 to be pushed upward in the insertion piece 126. As is shown in FIG. 5, the lower portion of the handy 101 is held securely in the swung-in position, among other things, as a result of the height $a_g$. of the front panel 130b of the insertion piece 126.

When the insertion piece 126 is swung outward, the height of the front panel $a_a$, that still is holding the lower portion of the handy 101 is reduced, as is illustrated in FIG. 6. The handy can be removed without difficulty. Damage to the front panel 130b is no longer possible.

Rather than the slide coupler 119 overlapping the inserted antenna base 121, it can also encompass a housing component that contains the antenna base. In addition, any areas of the handy housing can be covered by a slide coupler. The slide coupler would preferably be used in each case in the upper area of the handy, and the insertion piece would be used in the lower area with nearly a perpendicular mounting. The positioning of the slide coupler and the insertion piece may, however, be exchanged.

The supporting surfaces 132a and 132b of the collar pieces 129a and 129b need not necessarily run even with or perpendicular to the lateral ridges 123a and 123b of the base component. Because the lower portion of the handy 101 is pushed upward on the supporting surfaces 132a and 132b when the insertion component 126 is swung outward, its upper edge may have a (not illustrated) curved projection toward the top. This would result in a reduction in the remaining height of the front panel k in relation to the "closed" front panel height $a_g$ when the insertion piece is swung outward.

Rather than designing the insertion piece 126 to swing out, the collar pieces 129a and 129b can be designed to be spring-loaded. In the removal of the handy 1, its lower portion is then pushed upward via the force of the spring, and then rolls off the surface of the collar pieces.

In place of the two laterally oriented collar pieces 129a and 129b, a single unit may be positioned approximately in the center of the rear panel 130a of the insertion piece 126 on the base piece 105. In this case, however, the rear panel 130a would have.to have an opening for this single collar piece. The positioning of this single collar piece perpendicular to the shaft 125 would have to be similar to that of the two collar pieces. In comparison with the above-described construction, this is more costly and provides lower mechanical stability.

The above-described collar pieces 129a and 129b are positioned, in a most effective and simple construction, firmly attached to the lateral ridges 123a and 123b in the base piece. To augment the character of the collar pieces as ejectors, they could also be slid along via a slide coupler element that is positioned on the rear panel of the insertion piece, which could be shifted upward when the insertion piece is swung outward.

Figure 8:
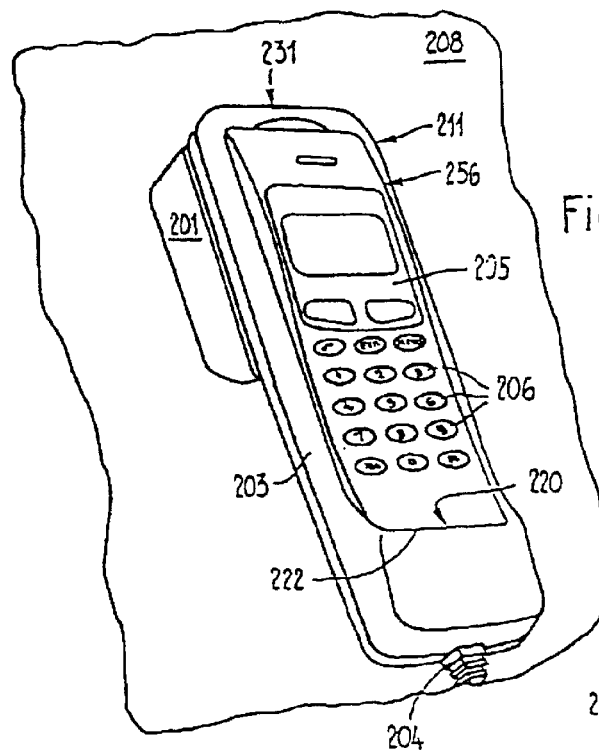
FIG. 8 is a perspective, overhead view of a telephone assembly having a console for mounting on a surface and a hand-held radio telephone designed as a handy and held in a shell such that it can be removed.
Figure 10:
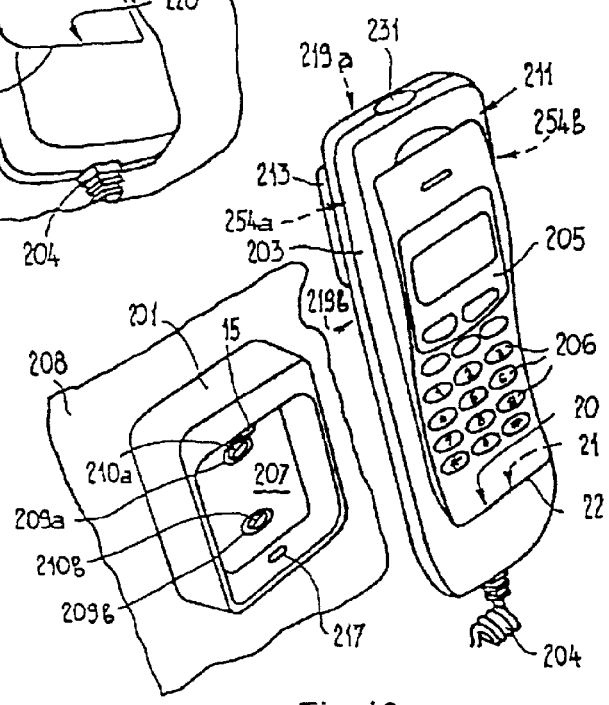
FIG. 10 is a perspective, overhead view of the telephone assembly illustrated in FIG. 8, wherein here the hand-held shell with the hand-held radio telephone is illustrated removed from the console.

The telephone assembly variation illustrated in FIG. 8 also comprises a console 201 and a handy or hand-held telephone 205 that can be held in a hand-held shell 203 such that it can be removed, and whose operating buttons 206 face upward. The shell 203 is connected to a cable 204 that supplies signals and power. The console 201, as is particularly illustrated in FIG. 10, is designed to be nearly square with an inner basin 207, and to be fastened with screws 210a and 210b, which lie in two recessed holes 209a and 209b, to a surface base 208. The mounting is selected such that the hand-held shell 203 and the handy 205 are held nearly vertical in the console 201. The inner basin 207 in the console 201 forms the counterpart to an additional receiver cap component 213 that is located in the upper portion 211 of the hand-held shell 203. The receiver cap component 213 contains a receiver 214 (dynamic, piezoelectric, . . . ). The inner basin 207 is equipped on two opposing walls of the basin with a spring-mounted nub 215a and a spring-held catch pin 217. The nub 215 and the catch pin 217 lock into corresponding recesses 219a and 219b in the side walls of the receiver cap component 213. The spring-mounted nub 215 is designed, with a side panel of the receiver cap component 213, as a spring-mounted bracket.

In FIG. 9, the hand-held shell 203 contains, in its lower portion, a rigid insertion cavity 220 for the lateral, positive-lock mounting of the lower edge of the handy 205. The edge of the cavity 222 encompasses the front and side edges of the handy 205. The base of the shell 223, which forms the rear panel of the hand-held shell 203, is compact in its design. It gives the shell 203 stability and at the same time serves as an insertion aid for the lower edge of the handy 205 into the cavity 220. In the insertion cavity 220, is a connector plug 226, mounted with a spring 225 such that it floats, for the transmission of power and signals to the handy 205, as an interface. The connector plug 226 is mounted on an end that is opposite the handy 205 such that it can swing around a swiveling axis 227 that runs parallel to the handy surface. The insertion cavity 220 is equipped with a microphone 229 (FIG. 11) that is open acoustically to the rear side 221.

In FIG. 9, the upper portion 211 of the hand-held shell 203 contains a mounting element 230 for the rear, upper section of the handy 205. In the mounting element 230, the handy is automatically pressed in and latched, and can be released for removal only via a release button 231 that is positioned in the hand-held shell 203 and is part of a release mechanism, which is illustrated in FIG. 10. The release button 231 is part of a plate 235 that can be pressed against a pressure spring 233 and is positioned in the base 223 of the shell 203. The plate 235 contains a channel 237, through which an ejector element 239, described below, extends, and is directed toward the lateral edges 236a and 236b of a depression 238 in the base 223 of the shell 203. The lateral widths of the channel 237 is greater by one allowance for play than the outer width of the ejection element unit 239. The length 1 of the channel is greater than the length of the ejection element 239 by one allowance, plus the release path of the release button 231. In the exemplary embodiment shown in FIG. 12, the ejection element 239 contains a circular cylindrical tappet 240.

Further, the plate 235 is provided with two guide grooves 243a and 243b that are designed to be symmetrical mirror images along their longitudinal center line 241, and run at a slant to this center line. A pin 244a extends into the guide groove 243a, and is positioned on the underside of an angled slide coupler 245a, which also is part of the mounting element 230. The angled slide coupler 245a can be moved along a groove 247a in the base of the shell 223. At its outer end, the angled slide coupler 245a contains a protruding angle leg 251a with a nose-like nub 253a as the catch element piece. This nub 253a extends into a corresponding depression 254a as the other component of the catch element, in the narrow side of the upper portion 256 of the handy 205. The nose tilt of the nub 253a tapers toward the top. In a mirror image to the angled slide coupler 245a, an angled slide coupler 245b having a corresponding angle leg 251b and a corresponding nub 253b is present, which can be shifted synchronously along the groove 243b, and whose nub 253b can be locked into a depression designed to match the depression in the opposing narrow side of the handy. The angle leg 251b with its nub 253b is illustrated in FIG. 9. As can be seen in FIG. 9 as well as in FIGS. 12 and 13, the plate 235, the other legs 255a and 255b that lie in the grooves 247a and 247b, and the pressure spring 233 are covered by a covering 257. The covering 257 is equipped with a hole 259 for the tappet 240 of the ejector element 239 that corresponds to the tappet's cross-section, but is enlarged for a clearance fit. This hole 259 serves as a guide for the tappet 240.

Figure 13:
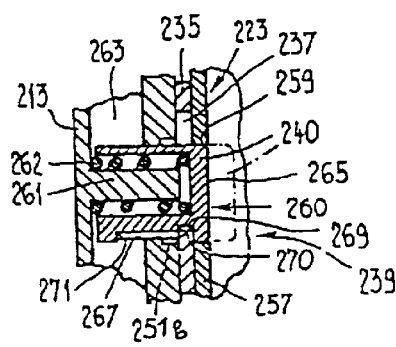
FIG. 13 is a cross-section of the mounting unit illustrated in FIG. 12, along the line VI—VI indicated in FIG. 12.

The tappet 240, which is illustrated in a longitudinal section in FIG. 13, rests in a circular cylindrical indentation 260 in the base of the shell 223. The indentation 260 has a centrally positioned, circular cylindrical elevated piece 261, which is distanced via an annulus 263 from the inner wall of the indentation 260. The elevated piece 261 serves as a lateral support for a pressure spring 262 which lies around the elevation. The tappet 240 is designed as a circular cylindrical cap, whose outer diameter is smaller by one play allowance than the diameter of the hole 259. The inner diameter of the tappet 240 is greater by one play allowance than the outer diameter of the pressure spring 262 that lies within the annulus 263. The depth of the annulus 263 and the depth of the cap are calculated such that there is sufficient space for the compressed pressure spring 262 and such that in a compressed state, the cap surface 265 of the tappet 240 rests nearly flush with the open surface of the covering 257.

In the outer covering of the tappet 240 lengthwise groove 267 extends in steps below the cap surface into a recess 269. Fitting as a catch into this recess 269, the plate 235, which can be shifted against the force of the spring 233 via the release button 231, contains a projecting piece 270. When the projecting piece 270 comes into contact in the recess 269 as a result of the force of the spring 233, the tappet 240 is held in its retracted position. At the same time, the angled slide couplers 245a and 245b are drawn toward the inside. In this position, a handy that has been placed in the hand-held shell 203 cannot fall out, as then the nubs 253a and 253b are in a positive-lock position in the corresponding depressions 254a and 254b in the long sides of the handy 205. When it is pushed out as a result of the pressure spring 262, the tappet 240 is kept from being completely pushed out by the contact of the projecting piece 270 with the stepped lower end 271 of the lengthwise groove 267 that extends up to the lateral surface of the cylinder.

The tappet 240 operates in conjunction with an electrical circuit that is not illustrated here. Only when the tappet is pressed inward are the microphone 229 and the receiver 214 in the hand-held shell activated.

If the release button 231 is pressed in when the handy 205 is inserted in the shell 203, the angled slide couplers 245a and 245b are shifted outward in the groove 247a or 247b via the guide grooves 243a and 243b and via the pins 244a and 244b. This causes the nubs 253a and 253b to be moved out of the corresponding depressions 254a and 254b in the long sides of the handy 205. The upper portion 256 of the handy 205 is now free, the lower edge of the handy 205 remains in the insertion cavity 220, held by the edge of the cavity 222. At the same time the projecting piece 270 is drawn out of the recess 269, which causes the tappet 240 to be released and pushed forward, via the pressure spring 262, out of the base of the shell 223, until the projecting piece 270 appears at the lower end 271 of the lengthwise groove 267. This causes the upper portion 211 of the handy 205 to be shifted out of the hand-held shell 203, at which point it can be easily grasped by the hand. The upper portion 211 is preferably pushed out by 5° to 20° for easy removal.

When the handy 205 is inserted, its long sides press against the angle legs 251a and 251b, as a result of the nose-like slant of the nubs 253a and 253b, in other words, against the angled slide couplers 245a and 245b, toward the outside. Via its pins 244a and 244b and the guide grooves 243a and 243b, the plate 253 is drawn in the direction A. If the handy 205 is almost completely pushed in, the nubs 253a and 253b become latched in the depressions 254a and 254b in the narrow side of the handy 205, and the projecting piece becomes caught in the recess 269. The handy 205 is locked in and the tappet is held, under the compressed pressure spring 262, in its depressed position.

As was mentioned above, when the tappet 240 is pressed in, an electrical circuit (not illustrated here) is completed, which activates the receiver 214 and the microphone 229 in the hand-held shell 203. If the tappet 240 is pressed in manually, without the handy 205 being inserted, a second partner can join the conversation.

Rather than shifting the angled slide couplers 245a and 245b via guide grooves 243a or 243b, and catch pins 244a or 244b, the plate and the angled slide coupler may be equipped with interlocking slanted pieces. In this case, angled slide couplers are pressed, via a spring, against one another, or against the plate. This force of pressure may also be generated via one spring pressing against each of the upward facing angle legs in the edge of the hand-held shell.

In the handys (hand-held radio telephones) preferably mounted in vehicles, precise dimensions for the handy to be inserted cannot always be used as a basis in the construction of the mounting. Depending upon the handy type, variations occur, in some cases even in the same model, when different "battery packs" (accumulators) are used.

It is thus recommended that the handy be inserted in the pick-up position of the insertion piece so that it will be allowed some play. The mounting is thus designed to be wide enough that the handy to be picked up (this may of course be understood to refer to handsets as well), regardless of its own thickness allowances, can be inserted or pressed in without pressure and also without danger of causing damage. Despite the wide mounting in which the handy is held with some play allowance, the springmounted contact pressure elements act upon it in the pick-up position with no pressure, or at the most with only slight pressure. Not only does this eliminate the danger of damage that has existed up to now in some types of mounts, it also eliminates the danger of damage that would be present in a spring mechanism that moved along with the mounting, since in the latter case the handy would rub against a wall of the mounting, which could cause traces of wear and scratches.

The contact pressure elements used here deploy their effect first when the insertion piece swings into a position of rest, wherein they press the handy in a position of rest with the maximum force of pressure, against the upper mounting piece, and if necessary, against the mounting fixture, so that the handy is held securely and cannot rattle during driving.

Figure 14:
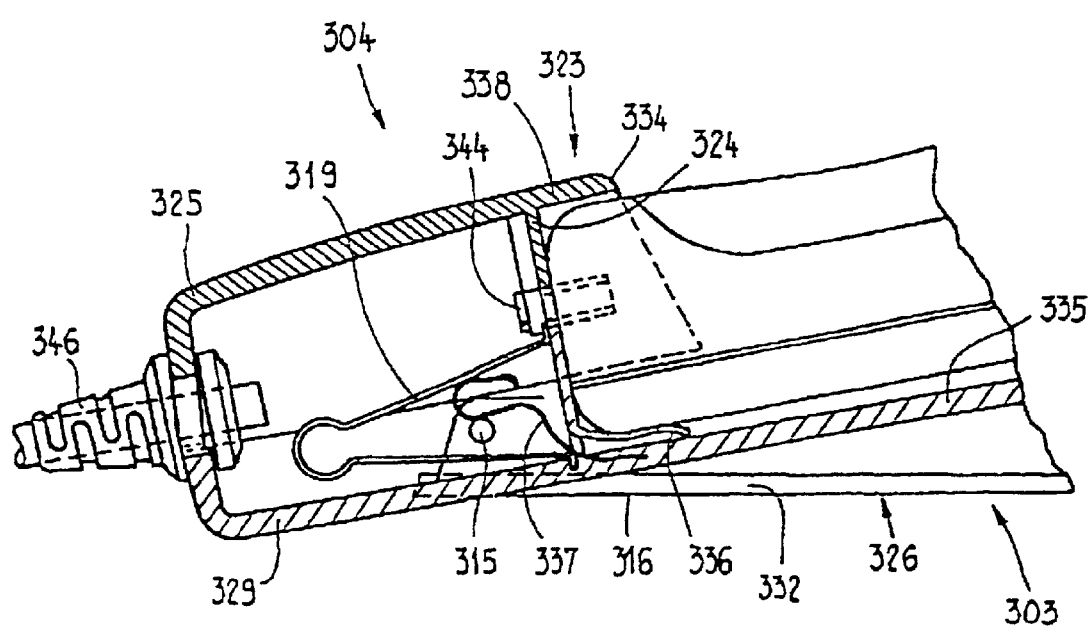
FIG. 14 is a longitudinal section of a variation of an insertion piece, in which a hand-held radio telephone is shown in a swungout position, from which it can be removed.

A swiveling axis 315 illustrated in FIG. 14, around which the insertion piece 304 is mounted such that it can swivel, is positioned at the base 316 of the hand-held shell 303. From the position of rest, the insertion piece 304 is swung into the pick-up position via a spring-mounted swiveling mechanism, namely a pair of clamp-type pressure springs 319 that are supported on the hand-held shell 303. By exerting pressure on the handy that has been removed from the insertion piece 304, against the force of the pair of pressure springs 319, the insertion piece 304 is directed into the swiveled-in position of rest. In this position, the antenna of the handy lies within a lengthwise groove in the face of the hand-held shell.

The insertion piece 304 is designed to be sheath-like. It contains a partition 324 which separates a cap-like end 325. The mouth of the insertion piece 304 is made to fit the lower end section of the handy with such great play, that handys of various thickness, namely handys having battery backs (accumulators of different powers) that vary by greater thickness allowances, can be inserted.

A supporting cap-like end 325 as an extension of the rear area of the insertion piece 304 is provided with a recess (not illustrated here), in which a very thin pressure tongue (pressure bracket) 336 is injection molded onto the partition 324, and acts as a pressure exchange component. A spring-mounted pressure source, namely a spiral spring (pressure spring) 337, supported on the hand-held shell 303, acts upon the pressure tongue 336. Via the pressure tongue 336, which is positioned in-between, the spiral spring 337 presses the handy at the upper side (sheath shell 338) of the mouth of the insertion piece, as soon as this piece is guided into the swung-in position of rest.

In the swung-out, pick-up position, the spiral spring 337 is completely relaxed, and its contact pressure end is separated from the pressure tongue 336, so that no pressure at all is exerted. When it is swiveled into the position of rest, however, the spiral spring 337 exerts greater and greater pressure, via the pressure tongue 336, onto the handy, until it, in the position of rest, presses the handy with maximum spring force against the upper portion of the mouth of the insertion component. The spring pressure exerted upward on the handy 302 thus also exerts pressure (although slight) on the antenna in its secure mounting fixture.

Due to the pressure of the spiral spring 337, both thin and thick handys 302 can be reliably and securely held, so that no rattling noises will be caused by vibrations, which would otherwise be impossible to avoid, for example, when driving over bumpy roads.

The mounting fixture can also be used for a handset rather than for a handy, for example it can be outfitted to accommodate the handset of a traditional automobile telephone. In this case the problem of different handy thickness is not a factor. On the other hand, the use of the above-described construction can also offer advantages for a fixed-installation, complete automobile telephone: The handset can be easily and simply inserted into the insertion component, which not only makes operating the telephone easier, but also reduces mechanical traces of wear on the outer surface of the base of the handset, and the danger of damage. In this case, the hand-held shell is most advantageously a mounting base that is to be securely mounted in the vehicle. In the design for the telephone mounting fixture for the handset, attention must naturally be paid to the design of the cable that is attached to the handset. For example, that section of the mouth of the insertion piece 304 that extends beyond the handset, and the caplike end 325, may contain a continuous-width groove to hold the handset connection cable. Most advantageously, in this case the mounting fixture (or the insertion piece and its mouth) extends in a bifurcated manner just over the edge of the upper side of the handset, so that the mounting fixture is freely accessible from above for the cable.

The spiral spring 337 can also be designed such that when the insertion piece 304 is in the swiveled-out, pick-up position, the spring exerts slight pressure on the pressure tongue 336 or the handy. It is, however, to be designed such that in the pick-up position, at the most only slight pressure is exerted on the handy 302, so that the handy can be inserted into and removed from the insertion piece 304 almost without pressure.

Rather than the thin pressure tongue or bracket 336 that is injection molded onto the insertion piece 304, a thicker pressure element may be used, which would be flexibly mounted to the insertion component. What is important is that, in any case, any elastic effect (spring effect) of the organ is smaller than the force or the elasticity of the spiral spring.

Finally, it is important that the pressure exerted be dependent upon the swiveling position, namely minimal in the pick-up position and maximal in the position of rest. This can be implemented via a pressure spring that is mounted onto the base component. With a pressure spring that moves along with the insertion piece, or with a pressure transfer element that supports the pressure spring elastically and moves along with it, this is possible only if the pressure spring or the transfer element is designed and positioned such that they, or it, in the position of rest, press against the hand-held shell, and, via the support this provides, press increasingly on the handy.

Generally, the pressure tongues or bracket 336 could be mounted to the hand-held shell 303 or to the spiral spring 337, rather than being injection molded to the insertion piece 304, wherein a spring effect would support the effect of the spiral spring 337 effectively. The positioning of the pressure element on the insertion piece is preferable, in and of itself, because this will ensure that the pressure element will not slide back and forth on the base of the handy and damage it.

The rear side of the hand-held shell can be designed as a mounting base for the purpose of anchoring it to a base or to a wall. This is particularly advantageous for fixed-mount, complete auto telephone assemblies, in which the mounting fixture holds a traditional handset.

The invention is naturally not limited to the above-described exemplary embodiments. It is obvious that the characteristics in the examples are interchangeable. For example, the hand-held shell may be mounted to the console in a variety of ways (magnetic mounting, clips, clamps, snap-catch device, . . . ). What is important for application in vehicles is a method of mounting that will protect the assembly even in the case of vibrations and sudden jolts.

The hand-held radio telephone may also be inserted or pressed into the handheld shell from the side rather than from the front (FIGS. 1a through 1c) or from the back (FIGS. 2a and 2b). Preferably, but not necessarily, the hand-held radio telephone, the hand-held shell, and the console form an optical or formed, rounded unit.

Basically, the console may be designed in any manner (in other words, in a known-in-the-art design). The hand-held radio telephone may be specially constructed for the assembly specified in the invention. The hand-held shell may, however, also be made to fit a hand-held radio telephone of known-in-the-art construction. The hands-free operation capabilities in the shell or in the console are optional; in other words, the shell may be designed as a mechanical mounting fixture with an antenna connection. It is obvious that the hands-free microphone or speaker may be positioned alternatively in the console or in the hand-held shell.

If the hand-held shell is equipped with an ear-piece and a mouthpiece, then telephone operation using the shell would be more comfortable, since the distance between the mouthpiece and the ear-piece is greater than with a handheld radio telephone. As is known, for reasons of weight and space, hand-held radio telephones are designed to be as small as possible.

A card reader, desirable in any case, for a chip or telephone card is preferably integrated into the hand-held radio telephone.

Naturally, however, the hand-held shell or the console may be equipped with corresponding capabilities.

The point at which the connector plug for the electrical coupling of the hand-held radio telephone is to be positioned depends not least upon how the hand-held radio telephone is constructed. Based upon the design of the hand-held radio telephone, the connector plug may be positioned at the top rather than at the bottom, on the side, or in some other position.

The console is naturally not a requirement. In principle, a small insertion mounting fixture for the hand-held shell is sufficient.

The distance between the mouthpiece and the ear-piece in the handset (or the hand-held shell) is preferably as great as possible, wherein the calculation of the distance takes into account the cross-talk or the so-called "echo return loss" and "stability loss", and may adhere to the DIN standard or corresponding international recommendations (Recommendation P 76). Because the hand-held radio telephone (preferably a so-called handy) is present in the form of a small and lightweight device, in the handset (or hand-held shell) designed to hold this the aspects of lightness and small size may lose importance in favor of the acoustic aspect, thus the arrangement would be designed such that the distance between the mouthpiece and the ear-piece would correspond to the distance between the mouth and the ear, or at least close to this distance, and acoustic feedback would be prevented, even when the ear-piece volume is high. Thus, the handset may also contain a mechanism for adjusting the volume (button or knob).

As was already mentioned, the ear-piece and mouthpiece are positioned on the inner side of the handset, and the buttons and the display (LCD) of the inserted hand-held radio telephone (or handy) are on the outside. In this arrangement, all buttons in the inserted hand-held radio telephone (handy) are accessible, the display(s) are fully visible, and the signal device has an unobstructed outlet. If the handset housing covers up important buttons, displays, or the acoustic signal device, the housing may be equipped with recesses at the appropriate points. For example, in the sheath-like insertion piece an opening designed in the shape of a mouthpiece may be provided for the signal device located at the lower end of the handy.

When the hand-held radio telephone is inserted in the handset, the transmitter of the hand-held radio telephone (handy) can be switched on as a hands-free transmitter for the handset.

The hand-held radio telephone (handy) is advantageously completely encompassed by the handset (by the hand-held shell). The hand-held radio telephone (handy) may, however, protrude slightly above the shell, for example, the handy antenna or the part of the handy that holds the antenna may extend beyond the shell.

The telephone assembly specified in the invention is especially well suited for an automobile telephone, in which the handset (hand-held shell) is connected to the (securely installed) automobile antenna, wherein the transmitting and receiving component (or radio component) is formed by the radio component present in the handy or by a special (more powerful) radio component, which may be positioned in the handset, in the console or the handset mounting fixture, or in the vehicle, for example in its trunk. The telephone assembly specified in the invention may, however, be used elsewhere, for example in ships, airplanes, and trains. The applications are not limited to the radio network (C-network, D-network, E-network). The handset or the hand-held shell may also be connected via a connecting cable, either indirectly, via a desk station, a mounting fixture, a console, etc., or directly, to the normal telephone cable network.

In addition, the telephone assembly may also be a device designed to hold only a hand-held radio telephone, as well as a complete telephoning device, wherein the hand-held radio telephone is preferably a so-called handy (with radio contact to terrestrial stations or satellites), but may also be a so-called cordless telephone.

What is claimed:

1. A telephone set comprising:
 a holder;
 a mobile telephone handset (handy) including a microphone and an earpiece;
 a telephone receiver including
  a shell shaped to manually, grasp and an adapter for the mobile telephone handset (handy), the telephone receiver being configured to be storable in the holder and to be removable from the holder for manual use while moving around freely,
  a recessed area that receives and electrically couples the mobile telephone handset (handy) to a connector plug, and
  a microphone and an earpiece, that allow for switching over from the mobile telephone handset microphone and earpiece once the mobile telephone is electrically coupled to the connector plug; and a signal transmission means for establishing a remote signal transmission link to the telephone receiver independent of an antenna on the mobile telephone handset, whether the telephone receiver is stored in the holder or moved around freely during a phone call, wherein the telephone receiver contains an interface in the connector plug for connecting the mobile telephone handset (handy) to the signal transmission means.

2. A The telephone set as claimed in claim 1, wherein the telephone receiver is electrically connected to a telephone circuit in the mobile telephone (handy) so as to be operable as a telephone handset, and the microphone of the telephone receiver being a hands-free microphone and being switchable from the microphone on the mobile telephone.

3. The telephone set as claimed in claim 2, wherein the holder is a bracket including a manually releasable locking unit constructed and arranged to lock the telephone receiver relative to the holder so that the telephone receiver cannot become loose when the holder and telephone receiver are vibrated.

4. The telephone set as claimed in claim 2, wherein the telephone receiver includes a quiver, which is swingable across a 10° to 20° arc, and into which the mobile telephone handset is at least partially inserted so that a control on the mobile telephone handset can still be operated.

5. The telephone set as claimed in claim 4, wherein a position of the quiver can be maintained stably.

6. The telephone set as claimed in claim 4, wherein the quiver includes a hinge-pin arranged on an external face of a quiver component, and a rear wall of the quiver extends up beyond the quiver rim so as to act as a guide plate for the mobile telephone handset inserted therein.

7. A The telephone set as claimed in claim 4, wherein the quiver is pivotable by a resilient pivoting means, braced against a portion of the telephone receiver, so as to swing out from a closed rest position into an open receiving position and, by pushing on the mobile telephone handset received therein against the resilient force of the pivoting means, swing into the closed rest position, the quiver being maintainable in the closed rest position by a retaining holder acting either on the quiver or on the mobile telephone handset, a receptacle being formed in the quiver or on the telephone receiver which grips the mobile telephone handset, wherein resilient snap means act directly through a recessed area of the quiver or indirectly by way of a pressure-transmitting member on the underside of the mobile telephone handset to push the mobile telephone handset against an overlapping part of the receptacle when the quiver is swung back into the closet rest position, wherein, when the quiver is swung open into the receiving position, the resilient snap means do not resist insertion or removal of the mobile telephone handset from the receptacle, the snap means comprising at least one compression spring, which acts directly or indirectly on an end-part the mobile telephone handset facing away from the retaining holder, wherein the resilient snap means act on a moveable pressure-transmitting member formed on or coupled with the quiver, preferably formed by a thin snap-tongue or snap-plate spray-molded onto the quiver.

8. The telephone set as claimed in claim 4, wherein the quiver has at least one cantilever arranged therein to provide a seat for the mobile telephone handset and a receiver for the cantilever part, so that the swinging action of the quiver causes a relative movement between a part of the cantilever unit contacting the mobile telephone handset and the upper edge of the quiver, so that the mobile telephone handset is removable from the quiver when the quiver is swung into the open position and is securely retained when the quiver is swung into the closed position.

9. A The telephone set as claimed in claim 8, wherein the receiver for the cantilever part is arranged fixed in relation to the position of the hinge pin of the quiver, the part of the cantilever unit contacting the mobile telephone handset extending in parallel with the hinge pin and in perpendicular to the plane in which the mobile telephone handset lies when in the inserted position, the receiver fills substantially the entire cross-section of the quiver except for a tolerance required for the swing-action of the quiver, and the hinge pin of the quiver is preferably arranged at the foot region of the cantilever unit offset to the rear of the mobile telephone handset contact surface thereof.

10. A The telephone set as claimed in claim 2, wherein the telephone receiver has a receiving for an antenna base of the mobile telephone handset or part of a housing for the antenna base of the mobile antenna handset, the mobile telephone handset is prevented from falling out of the telephone receiver by way of a retaining holder which automatically spans at least an upper surface area of the mobile telephone handset when inserted, wherein the retaining holder is a spring-biased slide latch which spans the antenna base or the part of the housing bearing the antenna base of the mobile telephone handset, whereby the retaining holder is manually slidable into an open position and retained in this position by way of a spring-biased ram resting in the retaining holder, and, for the top surface region of the mobile telephone handset, a gripping point is provided for the ram, by way of which the ram is movable from the rest position by releasing the retaining holder when the mobile telephone set is inserted.

11. A The telephone set as claimed in claim 2, wherein the telephone receiver has a rigid holder recessed to provide a lateral form-fit hold of the bottom edge of the mobile telephone handset and, in the top region a holding unit, for the top part of the rear-face of the mobile telephone handset can be inserted in an automatic lock fit and can only be unlocked for removal by means of a releasing device, and a dispenser unit is preferably provided to cooperate with the holding unit, which when released, pushes the top part of the mobile telephone handset forward, preferably across an angle of between 5° and 20° while the bottom edge of the mobile telephone set remains in the holder, so that it can be easily lifted out.

12. The telephone set as claimed in claim 1, further comprising:
    an interface for transmitting signals and power from the telephone receiver to the mobile telephone handset, one half of the interface being resiliently arranged in the holder so as to float about a hinge pin extending parallel with the telephone receiver floor and perpendicular to the longitudinal extension thereof.

13. A The telephone set as claimed in claim 2, wherein the telephone receiver is curved in an arc shape, the earpiece and mouthpiece of the telephone receiver being arranged at a side of the telephone receiver opposite the side of the telephone receiver recessed for receiving the mobile telephone handset, wherein a recessed area for the mobile telephone handset is constructed so that when the mobile telephone handset is inserted therein, a keypad of the mobile telephone handset thereof remains accessible.

14. A telephone set comprising:
    a holder;
    a mobile telephone handset (handy) including a microphone and an earpiece; and
    a telephone receiver including:

a manually graspable shell, an adapter for the mobile telephone handset (handy), a recessed shaped area, to receive and electrically couple to a connector plug the mobile telephone handset therein, including a bottom wall and a surround side wall corresponding to respective contours and dimensions of the mobile telephone handset, a microphone and an earpiece that allow for switching over from the mobile telephone handset microphone and earpiece once the mobile telephone is electrically coupled to the connector plug, the telephone receiver being configured to be storable in the holder and to be removable from the holder for use while not being stored in the holder; and a signal transmission means for establishing a remote signal transmission link to the telephone receiver independent of an antenna on the mobile telephone handset, whether the telephone receiver is stored in the holder or moved around freely during a phone call, wherein the telephone receiver contains an interface in the connector plug for connecting the mobile telephone handset (handy) to the signal transmission means.

15. The telephone set of claim 1, wherein the signal transmission means includes a helical cable.

16. The telephone set of claim 1, wherein the signal transmission means includes a radio interface of a cordless telephone.

17. The telephone set as claimed in claim 1, wherein the earpiece and the microphone of the telephone receiver are located on a side of the mobile telephone receiver opposite the side of the recessed area for receiving the mobile telephone handset, wherein the recessed area for the mobile telephone handset is inserted therein, and a keypad on the mobile telephone handset remains accessible.

* * * * *